April 11, 1961 K. RÄNTSCH 2,978,953
READING DEVICE FOR MEASURING SCALES
Filed July 31, 1957 9 Sheets-Sheet 1

Inventor
Kurt Räntsch
By
Singer Stern & Carlberg
attys.

April 11, 1961 K. RÄNTSCH 2,978,953
READING DEVICE FOR MEASURING SCALES
Filed July 31, 1957 9 Sheets-Sheet 2

Inventor
Kurt Räntsch
By
Singer Stern & Carlberg
attys

April 11, 1961 K. RÄNTSCH 2,978,953
READING DEVICE FOR MEASURING SCALES
Filed July 31, 1957 9 Sheets-Sheet 4

Inventor
Kurt Räntsch
By Singer Stern & Carlberg
attys

April 11, 1961  K. RANTSCH  2,978,953
READING DEVICE FOR MEASURING SCALES
Filed July 31, 1957  9 Sheets-Sheet 6

Inventor
Kurt Rantsch
By
Singer Stern & Carlberg
attys

April 11, 1961 K. RÄNTSCH 2,978,953
READING DEVICE FOR MEASURING SCALES
Filed July 31, 1957 9 Sheets-Sheet 7

April 11, 1961  K. RÄNTSCH  2,978,953
READING DEVICE FOR MEASURING SCALES
Filed July 31, 1957  *Fig. 18*  9 Sheets-Sheet 9

Inventor
Kurt Räntsch

United States Patent Office 2,978,953
Patented Apr. 11, 1961

2,978,953
READING DEVICE FOR MEASURING SCALES

Kurt Räntsch, Wetzlar, Germany, assignor to M. Hensoldt & Sohne Optische Werke A.G., Wetzlar, Germany Filed July 31, 1957, Ser. No. 675,380

Claims priority, application Germany Aug. 2, 1956

21 Claims. (Cl. 88—24)

The invention relates to improvements in a reading device for an optical indexing head provided with a movable circular measuring scale having double scale lines and in which the distance between each two pairs of said double scale lines is uniform.

It has been proposed heretofore to provide a reading device with a micrometric measuring scale capable of being slidably moved along a straight measuring scale and subdividing an interval of said measuring scale. Furthermore, optical means have been employed for projecting at least one division of the straight measuring scale and if desired also one scale division of the micrometric measuring scale into scale viewing window. If the straight measuring scale is shifted relative to the viewing window then one scale division of the straight measuring scale will always be positioned within the range of the micrometric measuring scale. By micrometrical displacement of the micrometric measuring scale one division of the letter can be brought to coincidence with a scale division of the straight measuring scale. The numerical values associated with the scale division on the straight measuring scale and the scale division on the micrometric measuring scale brought into coincidence with it will then give the approximate measuring value and the most correct measuring value is read on the micrometric scale.

This scale reading principle is applicable not only to straight measuring scales but according to the present invention is made available also to circular scales. Since the circular scale then takes the place of the rough measuring scale its manufacture is greatly simplified which is particularly advantageous because in the manufacture of circular scales great difficulties had to be overcome whenever the circular scales had to be very finely divided.

The advantage of the previously disclosed scale reading principle for circular scales is, however, obvious for all devices which employ such circular scales. The rough scale division may be the scale division on an optical indexing head. In such indexing heads it is customary to employ two scale divisions, namely, one rough scale division for the rotation of the working spindle under the control of the naked eye and one micrometric scale division for the fine adjustment or for scale reading in which auxiliary optical means are used. According to the present invention this micrometric scale division which is extremely costly to manufacture since it must be very accurate, may be omitted since the already present rough scale division is sufficient for obtaining the same reading accuracy.

This rough scale division may be constructed as a peripheral scale which is arranged, e.g. on the cylindrical face on the circumference of a flange or collar on the working spindle.

In order to project several scale divisions of this embodiment with equal sharpness into the viewing window of the reading device it is an advantage when the scale division is applied to the surface of a spherical zone. The scale divisions are then parts of circular arcs. The curvature of the rough scale division and the one of the scale lines in such an embodiment can be compensated easily by an intermediate lens of rotational symmetry. If, instead of a cylindrical scale division the scale division is arranged on the front face of the flange then no particular measures are required for optically correcting the shape of the scale division.

The micrometric scale division particularly in this last case may be arranged in the proximity of the rough scale division but it may also with advantage be arranged in the proximity of the viewing window. In such a case a very favorable construction of the viewing or reading device is possible, because the displacement of the micrometric scale division can then take place without the use of any intermediate members by means of a rotatable eccentric ring. The displacement of the micrometric scale division may also be accomplished by a measuring spindle in which case preferably the value indicated by the spindle drum appears in the viewing window.

The rough scale is preferably a 10° division in which each scale line consists of two closely spaced lines regardless whether the scale is arranged on a cylindrical surface or on the front face of a flange.

Particularly favorable conditions for projecting the rough scale to the reading window and for the construction of the slidable micrometric measuring scale are obtained in the case in which the micrometric measuring scale is arranged in the immediate vicinity of the reading window provided the diameter of the rough scale is so selected that between each two pairs of double lines there is a distance of approximately one centimeter.

In some cases it may be advantageous to arrange the front face scale (rough scale) in such a way that it cannot be observed by the naked eye. In such a case an additional rough scale, for instance, on a cylindrical face may be provided with advantage in order to enable adjustments of the working spindle to be carried out in known manner with the naked eye.

The present invention is not limited to the use on optical indexing heads, but the reading principle of the invention may be employed wherever circular scales are used, such as e.g. in optical turntables. Since in optical turntables higher accuracies are employed the rough scale is preferably subdivided in 1° intervals. If the micrometric scale which subdivides the 1° intervals is arranged in the vicinity of the reading window then the diameter of the rough scale is preferably selected of such a size that between the 1° scale lines of the rough scale there will be a distance of approximately one centimeter.

If one subdivides the rough scale in the aforementioned embodiments in such a way that the numbers of the scale are movable relative to the scale lines of the rough scale then one may start with the value zero after each revolution of the indexing head by rotating the numbers relatively to the stationary scale lines or of the turntable. The numbers for this purpose may be arranged e.g. on a rotary ring.

If the spindle of the indexing head has a definite position, then it is possible to rotate the ring carrying the numbers so that the value zero appears opposite the scale line appearing in the reading window and to start a new measurement from this position.

Since now, however, the scale line of the rough measuring scale may be given the numerical value zero while the measurement cannot be started from the actual value zero because then the micrometric scale would have to be moved so far that its zero point would come to coincidence with the scale line stroke at the rough measuring scale and because furthermore the micrometer also would have to indicate the value zero, it is still necessary in subsequent measurements to take the fine measuring value into consideration. If, for instance, an angular rotation of 87° and 30 minutes has been made then the number zero can be moved by rotation to a position opposite the scale line 87° so that this scale line receives the designation zero. The 30 minutes, however, do not disappear. These 30 minutes have to be taken into consideration during another new rotation, for instance, about 50° and 30 minutes, so that to the already present 30 minutes the degrees and minutes of the new angular rotation must be added. While this already represents a simplification compared with those designs in which an alteration of the numbering of the scale lines of the rough measuring scale was not provided at all, the zero setting according to the present invention permits of further substantial improvements in that no addition at all of angular values is required of the user of the indexing head.

This improvement is obtained by providing means for the purpose of laterally moving the image of the scale line of the rough scale appearing in the viewing window of the reading device, while the rough scale on the indexing head remains stationary. This lateral displacement can easily be made so great that after adjustment of the micrometer to zero, the scale line of the rough scale comes to coincidence with the zero line of the micrometer scale. In such a case it is possible, even though the spindle of the optical indexing head remains stationary, to follow with a new angular rotation in which one starts from the value zero.

The means for displacing the image of the scale line of the rough scale may be of different type. In a first embodiment of the invention it is proposed to arrange the entire optical means forming an image of the scale line of the rough measuring scale in such a manner that it may swivel about the spindle of the optical indexing head. This is equivalent with an arrangement in which the entire reading device changes its position relative to the rough measuring scale.

In order to effect this swivelling movement the image-forming optical system is preferably arranged in a housing which in turn is rotatably mounted on the spindle of the indexing head. Between the housing and the indexing spindle may be arranged a ball bearing and the swivelling movement itself may be effected by a spindle which rotates the housing.

In another embodiment a roof prism is arranged in the path of the image forming rays. This prism according to the invention is made laterally movable. This lateral movement also effects a displacement of the image of the scale line of the rough measuring scale in the reading window so that the same purpose is obtained.

The roof prism in this case is preferably made slidable in a dovetail guide and the movement of the prism is effected by a cam disk. In order to assure always a continuous contact between the cam disk and the roof prism a spring is provided which exerts pressure upon the roof prism. The invention also provides locking means which assure the user that the zero position does not change during a measuring operation. In the first embodiment the housing containing the image-forming optical system is clamped in position and in the second embodiment means are provided which prevent accidental movements of the roof prism.

The drawings disclose several embodiments of the invention.

In the drawings.

Figure 1:
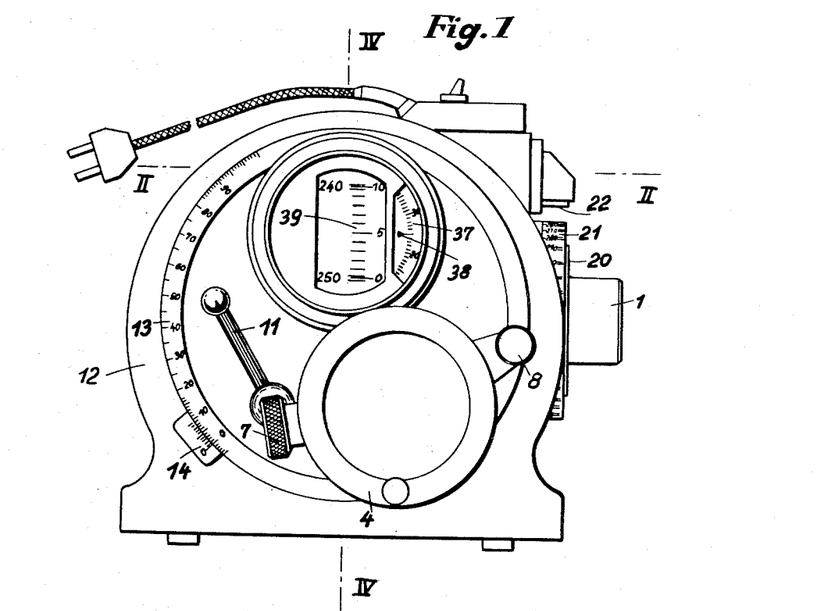
Fig. 1 is a side elevation view of an optical indexing head.
Figures 2, 5, 6, 7:
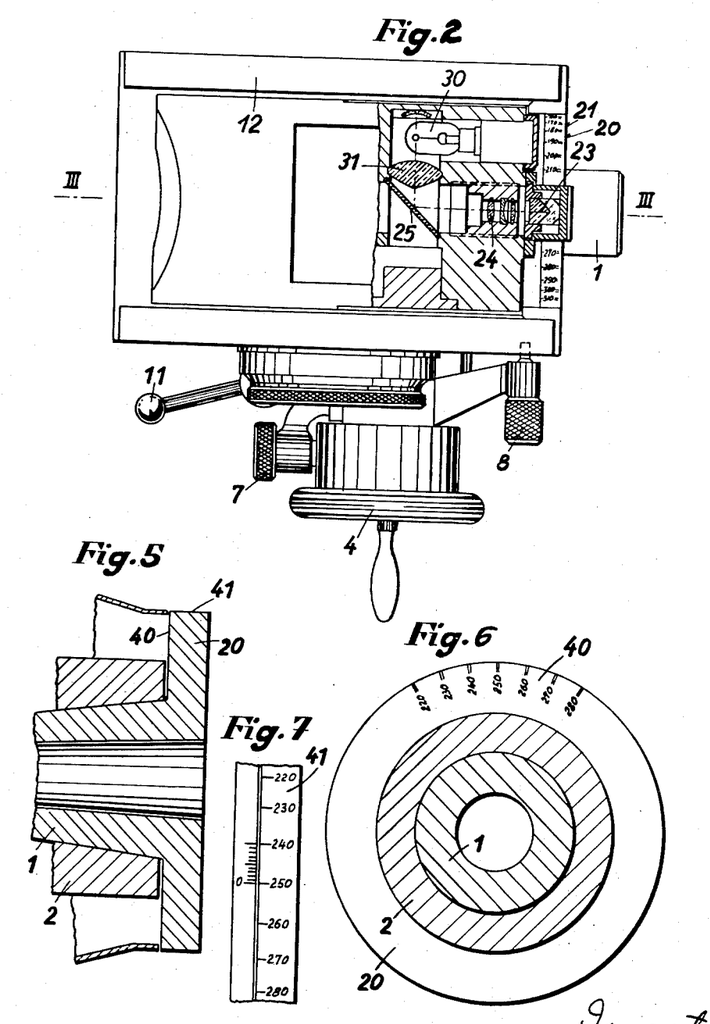
Fig. 2 is a horizontal sectional view along the line II—II of Fig. 1.
Fig. 5 shows a modified scale arrangement.
Fig. 6 is a face view of the scale arrangement of Fig. 5.
Fig. 7 shows a partial plan view of the parts shown in Fig. 5.
Figure 3:
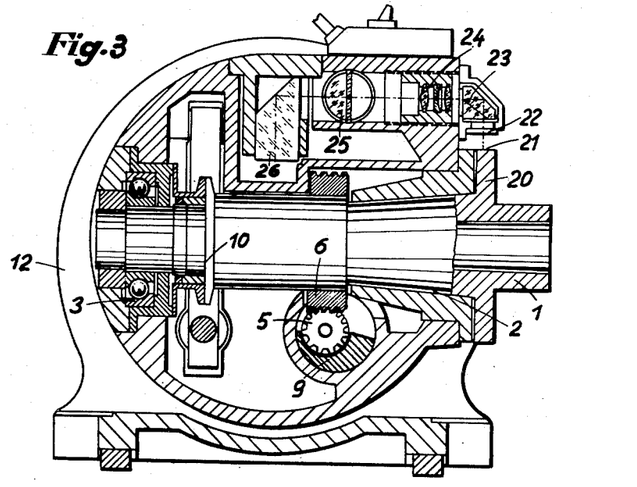
Fig. 3 is a sectional view along the line III—III of Fig. 2.
Figure 4:
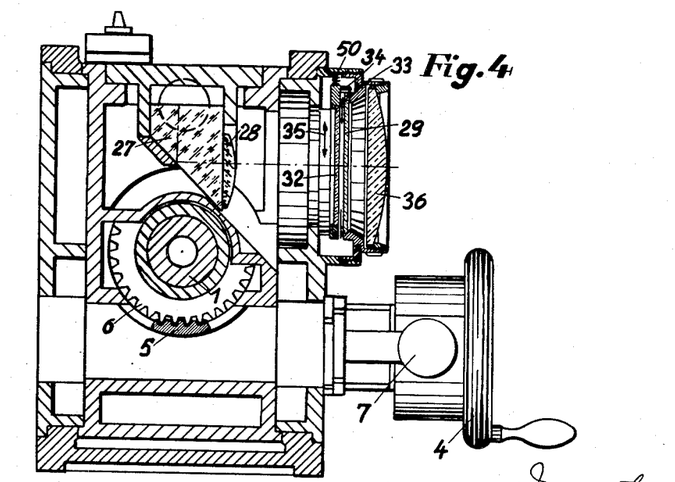
Fig. 4 is a vertical sectional view along the line IV—IV of Fig. 1.

Referring to the Figs. 1 to 4, inclusive, a working spindle 1 is rotatably supported by a conical sleeve bearing 2 and a ball bearing 3 in conventional manner. A handwheel 4 is employed for rotating the spindle 1 by means of worm 5 which meshes with a helical wheel 6 attached to the working spindle 1. A micrometric drive 7 is provided for the fine adjustment of the working spindle 1. In order to permit a direct manual rotation of the working spindle 1 the worm 5 can be disengaged from the helical wheel 6 and for this purpose the worm 5 is supported in eccentric bearings as shown in Fig. 3. Upon rotative adjustment of the eccentric bearings 9 by an operation of a lever 8 (Fig. 2) the worm 5 is separated from the helical wheel 6.

For the purpose of locking the working spindle 1 a ring brake 10 is provided which is operated by a lever 11. The indexing head may be swivelled within the housing 12 in known manner so that the working spindle 1 may be rotated from the horizontal position shown in Figs. 1 and 2 to a vertical position. The amount of rotation can be read on a scale 13 with a vernier 14 (Fig. 1).

The working spindle 1 is provided with a flange 20 provided on its cylindrical circumferential face with a scale 21. The light rays reflected from a scale line of the scale 21 into a window 22 arranged above the scale 21 are deflected by a roof prism 23 into an objective 24 and by a semi-transmitting reflecting surface 25 and a prism 26 are directed into another prism 27 (Fig. 4) from where they are projected through an intermediate lens 28 onto a screen 29 in the window of a viewing device.

The scale 21 is illuminated by a source of light 30 (Fig. 2) the rays of which pass through a condenser lens 31 and a partly transmitting mirror 25 through the objective 24 and the roof prism 23 and then onto the scale 21. Directly adjacent the translucent screen 29 is arranged a clear glass plate 32 (Fig. 4) which is movable in both directions as indicated by the double arrow 35. The movable adjustment of the glass plate 32 is effected by a rotation of an eccentric ring 33 which engages a pin 34 attached to the glass plate 32. The pin 34 is continuously kept in engagement with the eccentric ring 33 by a spring 50. A lens 36 serves for the observation of the scale divisions appearing on the screen 29. The rotatable eccentric ring 33 is provided with a circular scale 37 (Fig. 1) from which the amount of the movement of the glass plate 32 can be read by means of an index mark 38. The glass plate 32 has arranged thereon a micrometric scale 39 (Fig. 1) which subdivides the image of one interval of the rough scale appearing in the viewing window of the reading device into ten equal parts. The image of the rough scale 21 shows a 10° division so that the micrometric division allows the determination of the angle of rotative adjustment of the working spindle 1 to an accuracy of 1°. If one line of the rough scale appears within an interval of the micrometric scale 39 then the eccentric ring 33 is rotated until the double scale line of the rough scale encloses a line of the micrometric scale 39. In Fig. 1 the double line 250 of the rough scale encloses the line 0 of the micrometric scale 39. In order to obtain this result it was necessary to rotate the circular scale 37 to its value 25. The circular scale 37 shows 60 units so that the value indicated by the reading device is 250 degrees and 25 minutes.

The Figs. 5–7 illustrate a modified embodiment of the invention. The cylindrical scale 21 of the Figs. 1–4 is replaced by a front face scale 40. The front face scale 40 is not visible to the naked eye of the operator. For the purpose of roughly reading the position of the indexing head with the naked eye there is provided an additional cylindrical scale 41. The operation of the indexing head is then the same as the one described in connection with the Figs. 1 to 4, inclusive.

Figure 18:
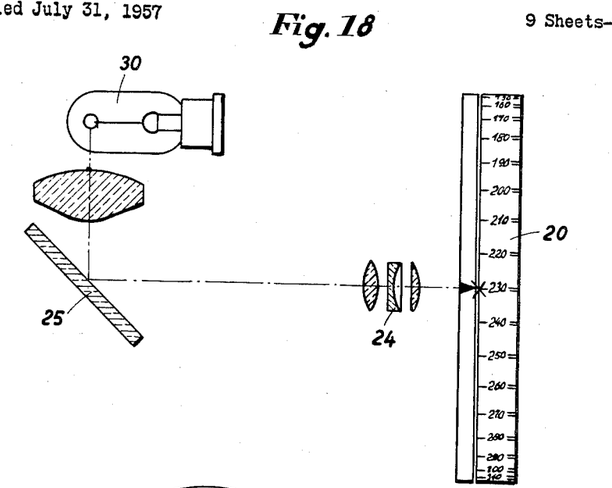
Fig. 18 illustrates the illuminating device for the modified scale arrangement of Figs. 5, 6 and 7.
Figure 19:
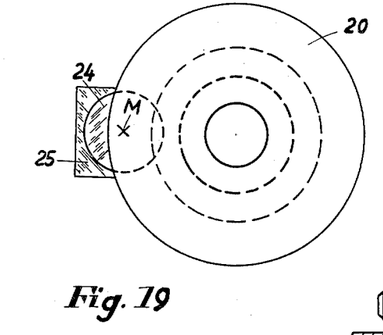
Fig. 19 illustrates the projecting arrangement for the modified scale arrangement of Figs. 5, 6 and 7.
Figure 20:
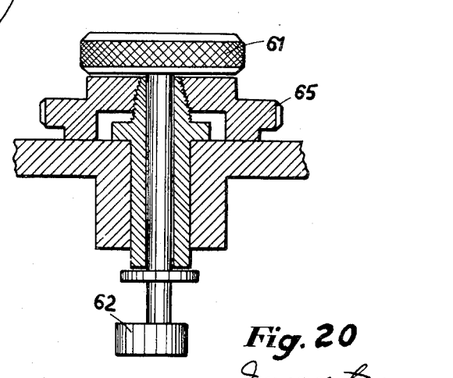
Fig. 20 illustrates in an enlarged scale the device for adjusting and locking the roof top prism of Fig. 15 in the desired position.

The Figs. 18 and 19 illustrate the manner in which the rough front face scale 40 is projected onto the reading window. The same illuminating system 30, 31, 25 and 24 (Fig. 2) and the same projecting system as shown in Fig. 5 are employed, except that the prism 23 has been omitted which hereto was required to deflect the rays coming from the cylindrical scale 21 horizontally. According to Fig. 18 the rays from the front face scale 40 enter directly into the objective 24 which according to Fig. 19 is arranged somewhat offset from the axis of rotation of the flange 20.

Figure 8:
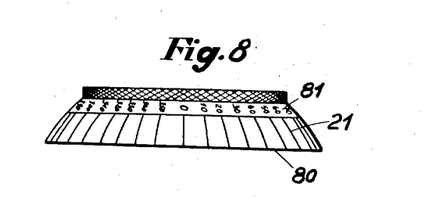
Fig. 8 illustrates a modified rough scale arrangement.

In Fig. 8 the rough scale 21 is arranged on the surface of a spherical zone. Accordingly, the scale lines form parts of great circles of a sphere. The scale is divided into two sections 80 and 81 of which the section 80 arranged on a part which is rigidly connected to the working spindle 1 while the scale section 81 is arranged on a rotary ring. The circularity of the scale lines as well as the curvature of the scale 21 in this embodiment may be flattened by an intermediate lens e.g. the lens 28 in Fig. 4. The adjustability of the numbers has the result that after a predetermined rotation of the working spindle 1 a new rotation by a definite angle can immediately be made to follow without requiring a preliminary calculation of the total angle of rotation. It is only necessary to rotate the number zero of the rough scale until its image appears in the reading window.

Figure 9:
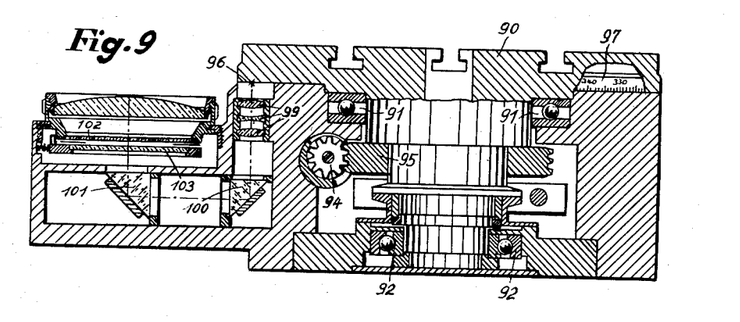
Fig. 9 is a sectional view of an optical turntable.
Figure 10:
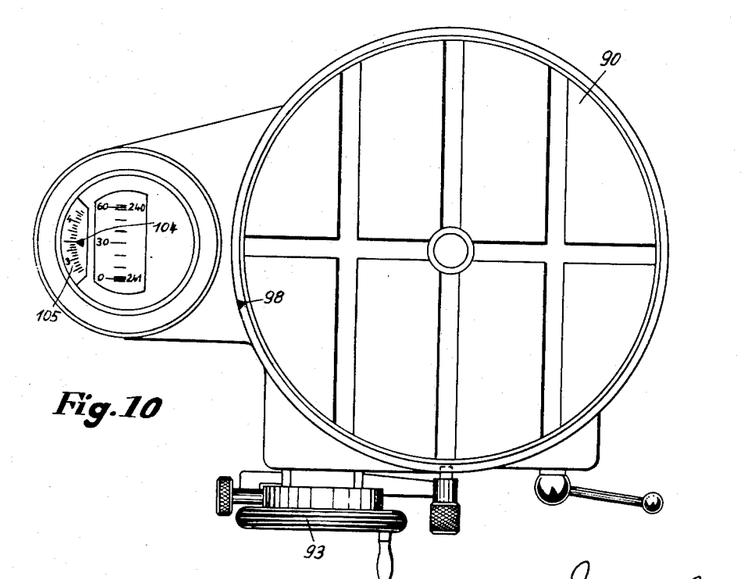
Fig. 10 is a plan view of the turntable shown in Fig. 9.

The Figs. 9 and 10 show the application of the present invention to an optical turntable. The table 90 is rotatably supported by ball bearings 91 and 92. Its rotation is effected by a handwheel 93 by means of a worm 94 which meshes with an annular wormwheel 95 attached to the table 90. On the underside of the table 90 is arranged a front face scale 96. A cylindrical scale 97 is used for the rough adjustment of the turntable 90 which cooperates with an index 98. An image of the front face scale 96 is projected into a reading window 102 by the objective lenses 99, and the prisms 100 and 101. The front face division 96 is divided into 1° intervals so that corresponding intervals appear magnified in the reading window. A 10′ scale is arranged on a clear movable glass plate 103. The glass plate 103 is movably adjustable in the same manner as the glass plate 32 shown in Fig. 4. The amount of adjustments of the glass plate 103 can be read off on a circular scale 105 by means of an index mark 104. The circular scale 105 is divided into 120 parts so that therefore each interval corresponds to 5″. In Fig. 10 the value appearing in the reading device is 241°3′25″.

Figure 11:
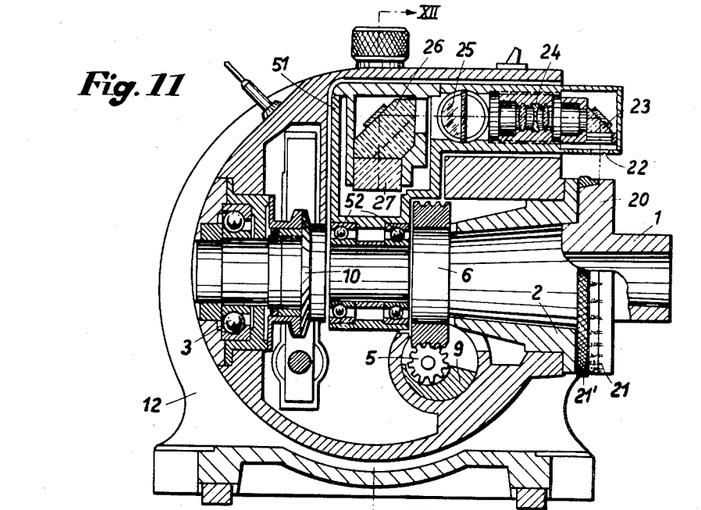
Fig. 11 is a sectional view of an optical indexing head with a pivotally mounted image forming optical system.
Figure 12:
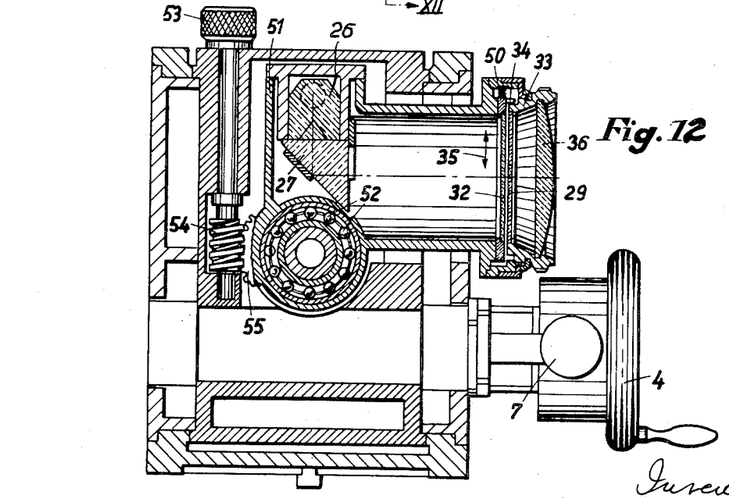
Fig. 12 is a vertical sectional view along the line XII—XII of Fig. 11.

According to Figs. 11 and 12, the working spindle 1 is provided with a cylindrical collar 20 which carries a cylindrical scale 21 on its circumference. On the cylindrical part 20 is mounted a ring 21′ which is provided with numbers for the scale 21. The light rays reflected by a scale line of the scale 21 and which enter a window 22 above the scale 21 are deflected by a prism 23 into an objective 24 and by a semi-transmitting surface 25 and a roof prism 26 are directed into a prism 27 from where they are projected onto the image screen 29.

The scale 21 is illuminated in similar manner as shown in Fig. 2. Directly adjacent the translucent image screen 29 is arranged a clear glass plate 32 having micrometric scale 39 thereon and which is movable in the direction of the double arrow 35. The movement of the plate 32 is effected by the rotation of an eccentric ring 33 engaging a pin 34 fixedly connected to the glass plate 32. The pin 34 is maintained in engagement with the ring 33 by the pressure of a spring 50. A lens 36 serves for the observation of the scale lines on the image screen 29. The rotary eccentric ring 33 carries a circular scale 37 (Figures 3, 6 and 7). The amount of the movement of the glass plate 32 can be read off on the scale 37 by means of an index mark 38.

The micrometric scale 39 on the glass plate 32 subdivides one interval of the image of the rough measuring scale 21 appearing on the image screen into 10 parts. The rough scale 21 shows a 10° division so that the micrometric scale permits the determination of an angle of rotation of the working spindle to an accuracy of 1°. If one scale line of the rough scale should come to lie within one interval of the micrometric scale 39, then the eccentric ring 33 is rotated until the double line of the rough scale encloses one line of the micrometric scale 39 (see Figure 13a). In this figure, the double scale line indicating 130° on the rough scale encloses the line 4° of the micrometric scale. In order to obtain this, it was necessary to rotate the circular scale 37 to the value 33. The circular scale 37 is divided into 60 units, so that the value indicated in Fig. 13a is 134° and 33 minutes.

According to Figs. 11 and 12, the image forming elements are arranged in a housing 51 which is rotatably attached to the spindle 1 by ball bearings 52. In this position of the spindle 1, one may begin a new rotation of the spindle 1 until the starting point appears in the reading window, namely the value 0° 0 minutes. The rotation of the housing 51 is effected by a rotatable knob 53 on the shaft extension of which is attached a worm 54 which meshes with a wormwheel segment 55 rigidly attached to the housing 51.

Figure 13A:
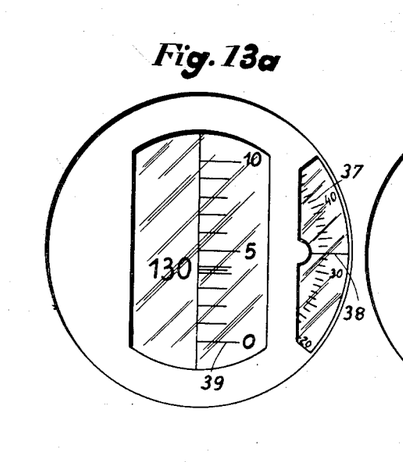
Figs. 13a, 13b, 13c and 13d show the field of view of the reading device in various positions of the micrometric scale and the scale line of the rough measuring scale.
Figure 13B:
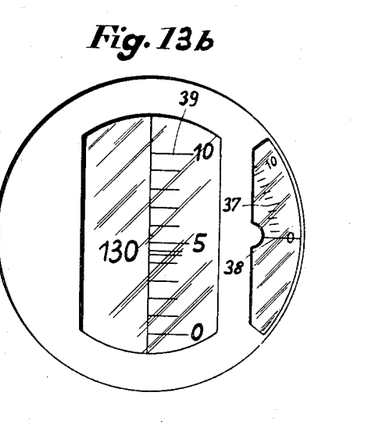

In order to begin from the position of the spindle 1 shown in Figure 13a, with a new adjustment from the value zero, the following steps are necessary:

First, the scale 37 is adjusted to zero by operating the knurled ring 33 (Figure 13b). This causes the micrometric scale 32 to be displaced in the direction illustrated, i.e., the double scale line 130 of the rough measuring scale encloses no longer a line of the micrometric scale 39.

Figure 13C:
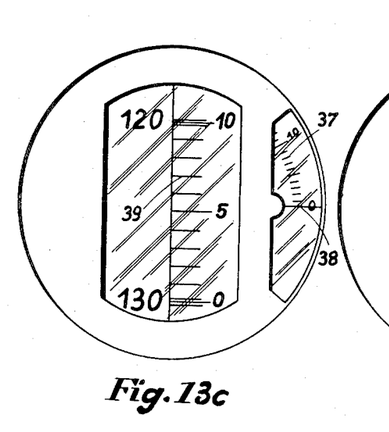
Figure 13D:
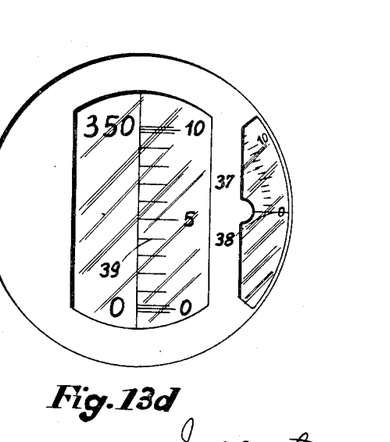

The entire scale reading optical system is then swivelled by operating the rotary knob 53 in such a way that the double scale line 130 on the rough measuring scale is shifted so far that it encloses the zero line of the micrometric scale 39, as shown in Fig. 13c. Finally, the ring 21′ has to be rotated so far that in the place of the number 130 in Figure 13c, the number 0 appears, see Figure 13d. Now the reading device is adjusted to zero without requiring any rotative adjustment of the spindle 1. In this position, one can therefore start a new measurement or a new adjustment of the spindle 1 without considering the previous position of the spindle which was 134° and 33 minutes.

Figure 14:
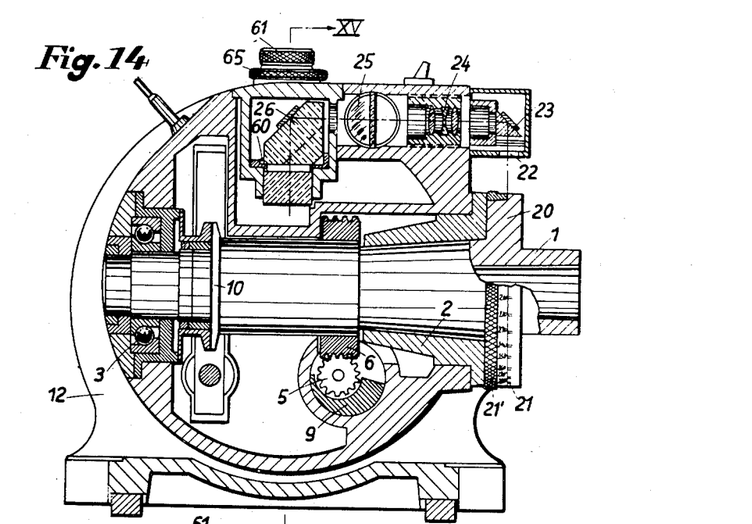
Fig. 14 illustrates a modified embodiment of the invention.
Figure 15:
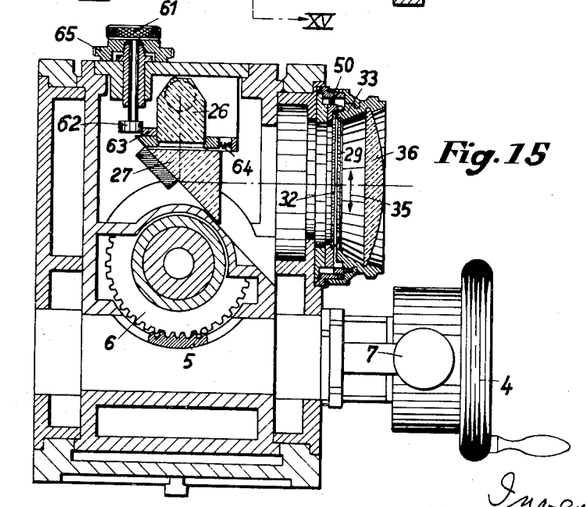
Fig. 15 is a sectional view along the line XV—XV in Fig. 14, Figs. 16a, 16b, 16c and 16d show the field of view of the reading device of the modification shown in Figs. 14 and 15 in various positions.

The Figures 14 and 15 disclose an embodiment in which the scale reading optical system is fixedly arranged. In order to shift the image of the scale line of the rough measuring scale, the roof prism 26 is slidably arranged in a dovetail guide. The movement of the prism is effected by a rotary knob 61 which is rotatably connected with a cam disk 62. The cam disk 62 exerts pressure upon the mount 63 of the roof prism 26. In order to assure a continuous engagement of the roof prism 26 with the cam disk 62, the prism 26 is subjected to the action of a spring 64.

Means for locking are provided in the shape of a knurled ring 65 to make sure that the prism 26 is moved only when the rotatable knob 61 is intentionally rotated. When the knurled ring 65 is tightened the rotatable knob 61 is clamped against the cam disk 62 and the prism 26 remains in its adjusted position.

Figure 16A:
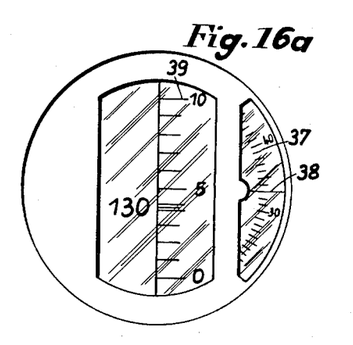
Figure 16B:
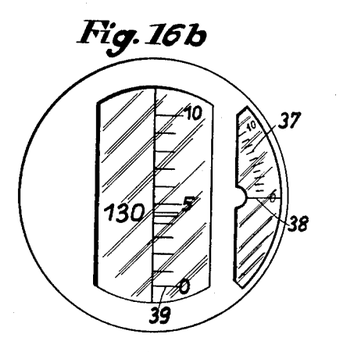
Figure 16C:
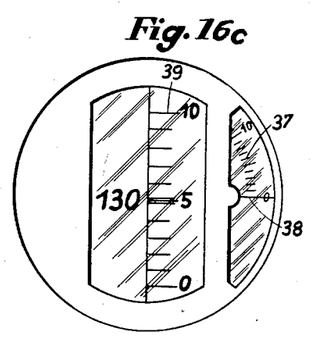
Figure 16D:
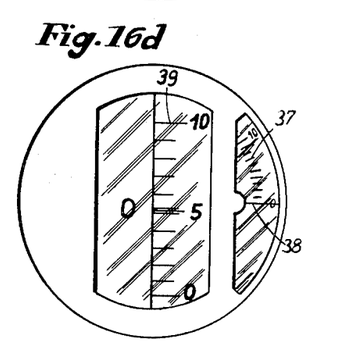

The mode of action of this device is the following:

Figure 16a shows the same measuring position as Figure 13a. In order to adjust the reading device to zero, the knurled ring 33 is first turned so far again that the value zero is read off on the scale 37 opposite the index mark 38 (Fig. 16b). Thereupon, the prism 26 is moved by operation of the rotary knob 61, until the image of the scale line 130 is moved to the position as shown in Figure 16c.

The prism 26 does not permit such an extended movement of the image as can be obtained by the rotation of the entire optical system as shown in the Figures 11 and 12. For this reason, the scale line 130 is shifted only so far that the corresponding double scale encloses the scale line 5 of the micrometric scale. Thereupon, the figure 0 is placed in the position of the number 130 again by rotation of the ring 21', and a new rotation of the indexing spindle can be undertaken which in this case, however, does not start from the value 0° 0 minutes, but from the value 5° 0 minutes. While this represents a small disadvantage compared with the Figures 11 and 12, the modification using the movement of the roof prism 26 carries with it the advantage of greater simplicity.

Figure 17A:
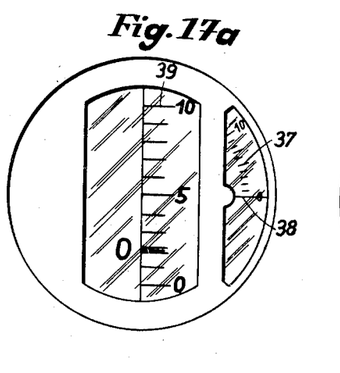
Figs. 17a and 17b show the field of view of the reading device of the modification shown in Figs. 14 and 15 and explain the adjustment procedure.
Figure 17B:
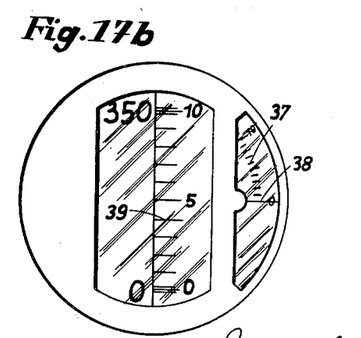

The Figures 17a and 17b disclose a further modified application of the invention. It happens over and over again that a workpiece has to be clamped into the indexing head, so that it is exactly aligned with respect to a certain reference surface. Thereafter, the workpiece is rotated. One would prefer to start now with a measuring value zero in order to avoid complicated calculations in the adjustment of the angle of rotation. This is not possible with devices of the prior art.

According to the present invention, however, the workpiece is clamped to the spindle 1 with an accuracy of approximately 1°. The remaining alignment is then undertaken by means of the micrometric drive 7. The spindle has to be rotated, however, and the double line of the rough scale moves away, for instance, into the position shown in Figure 17a. With the device according to the invention, it is now possible to shift the double line having the number zero by rotation of the rotary knob 61 so far that it encloses the zero line of the micrometric scale. In this manner a zero adjustment of the reading device as well as an alignment of the workpiece with respect to a reference surface is obtained in the simplest possible manner.

I claim:

1. Reading device for an indexing head comprising a movable circular measuring scale having double scale lines and the distance between each two pairs of said double scale lines being 10°, optical means for projecting an image of a portion of said circular measuring scale onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said circular measuring scale onto said viewing screen, said circular measuring scale being provided with double scale lines and the distance between each two pairs of said double scale lines being 10°.

2. Reading device for an indexing head comprising a movable circular measuring scale having double scale lines and the distance between each two pairs of said double scale lines being 10°, optical means for projecting a portion of said circular measuring scale arranged on said indexing head onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said circular measuring scale being provided with double scale lines and the distance between each two pairs of said double scale lines being 10°.

3. Reading device for an indexing head comprising a movable circular measuring scale having double scale lines and the distance between each two pairs of said double scale lines being 10°, optical means for projecting an image of a portion of said circular measuring scale arranged on a cylindrical surface onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said circular measuring scale being provided with double scale lines and the distance between each two pairs of said double scale lines being 10°.

4. Reading device for an indexing head comprising a movable circular measuring scale having double scale lines and the distance between each two pairs of said double scale lines being 10°, optical means for projecting an image of a portion of said circular measuring scale arranged on the front face of an annular flange onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said circular measuring scale being provided with double scale lines and the distance between each two pairs of said double scale lines being 10°.

5. Reading device for an indexing head comprising a movable circular measuring scale having double scale lines and the distance between each two pairs of said double scale lines being 10°, optical means for projecting an image of a portion of said circular measuring scale arranged on the outer marginal portion of a spherical zone onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said circular measuring scale being provided with double scale lines and the distance between each two pairs of said double scale lines being 10°.

6. Reading device for an indexing head comprising a movable circular measuring scale having double scale lines and the distance between each two pairs of said double scale lines being 10°, optical means for projecting an image of a portion of said circular measuring scale arranged on the outer marginal portion of a spherical zone onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, and optical means for straightening the spherical scale lines during their projection onto said viewing screen, said circular measuring scale being provided with double scale lines and the distance between each two pairs of said double scale lines being 10°.

7. Reading device for an indexing head comprising a movable circular measuring scale having double scale lines and the distance between each two pairs of said double scale lines being 10°, optical means for projecting a portion of said circular measuring scale arranged on the front face of a flange provided on said indexing head onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen said circular measuring scale being provided with double scale lines and the distance between each two pairs of said double scale lines being 10°.

8. Reading device for an indexing head comprising a movable circular measuring scale having double scale lines and the distance between each two pairs of said double scale lines being 10°, optical means for projecting an image of a portion of said circular measuring scale onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said circular measuring scale being provided with double scale lines and the distance between each two pairs of said double scale lines being 10°, the diameter of said circular measuring scale being such that said 10° distance amounts to approximately one centimeter.

9. Reading device for an indexing head comprising a movable circular measuring scale having double scale lines and the distance between each two pairs of said double scale lines being 10°, optical means for projecting a portion of said circular measuring scale arranged on said indexing head onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said measuring scale being arranged in a position to be visible to the naked eye, and that adjacent said visible measuring scale there is arranged a similar measuring scale on the front face of a flange of said indexing head which last mentioned scale is projected onto said viewing screen said last mentioned measuring scale being provided with double scale lines and the distance between each two pairs of said double scale lines being 10°.

10. Reading device for an indexing head comprising a movable circular measuring scale having double scale lines and the distance between each two pairs of said double scale lines being 10°, optical means for projecting a portion of said circular measuring scale arranged on an optical turntable onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said circular measuring scale being provided with double scale lines and the distance between each two pairs of said double scale lines being 10°, said circular measuring scale having a division of 1° and the diameter of said scale being of a size that the distance between said 1° division lines is approximately one centimeter.

11. Reading device for an indexing head comprising a movable circular measuring scale having double scale lines and the distance between each two pairs of said double scale lines being 10°, optical means for projecting a portion of said circular measuring scale arranged on said indexing head onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said measuring scale being composed of two concentrically arranged sections, one section being provided with numbers and the other section with scale lines, and means for rotatably adjusting said sections having the numbers with respect to the section having the scale lines of said measuring scale.

12. Reading device for an indexing machine having an optical indexing head, comprising a circular measuring scale arranged on said indexing head, said circular measuring scale being provided with double scale lines and the intervals between each pair of said double scale lines being uniform, optical means for projecting an image of a portion of said circular measuring scale onto a plane viewing screen, a spindle on which said indexing head is fixedly attached, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, means causing a lateral displacement of the image of said circular measuring scale on said image screen even though the measuring scale on said indexing head remains stationary, said means comprising a housing having mounted thereon said viewing screen and said eccentric ring which latter is rotatably adjustable relatively to said housing, said housing also supporting said optical means for forming said image of said circular measuring scale, and means for rotatably adjusting said housing with said optical elements therein about the axis of said spindle of said optical indexing head.

13. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a spindle on which said indexing head is fixedly attached, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, means causing a lateral displacement of the image of said circular measuring scale on said image screen even though the measuring scale on said indexing head remains stationary, said means comprising a housing having mounted thereon said viewing screen and said eccentric ring which latter is rotatably adjustable relatively to said housing, said housing also supporting said optical means for forming said image of said circular measuring scale, means for rotatably adjusting said housing with said optical means therein about the axis of said spindle of said optical indexing head, and means for rotatably supporting said housing on the spindle of said indexing head.

14. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a spindle on which said indexing head is fixedly attached, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, means causing a lateral displacement of the image of said circular measuring scale on said image screen even though the measuring scale on said indexing head remains stationary, said means comprising a housing having mounted thereon said viewing screen and said eccentric ring which latter is rotatably adjustable relatively to said housing, said housing also supporting said optical means for forming said image of said circular measuring scale, means for rotatably adjusting said housing with said optical means therein about the axis of said spindle of said optical indexing head, and ball bearings for rotatably supporting said housing on the spindle of said indexing head.

15. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a spindle on which said indexing head is fixedly attached, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, means causing a lateral displacement of the image of said circular measuring scale on said image screen even though the measuring scale on said indexing head remains stationary, said means comprising a housing having mounted thereon said viewing screen and said eccentric ring which latter is rotatably adjustable relatively to said housing, said housing also supporting said optical means for forming said image of said circular measuring scale, means for rotatably adjusting said housing with said optical means therein about the axis of said spindle of said optical indexing head, and micrometric adjusting means for rotatably adjusting said housing about the spindle of said indexing head.

16. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a plane glass plate provided with a straight micrometric scale arranged adjacent said plane viewing screen, and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, and means causing a lateral displacement of the image of said circular measuring scale on said image screen even though the measuring scale on said indexing head remains stationary, said last mentioned means including a roof top prism and means for laterally adjusting the same.

17. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, and means causing a lateral displacement of the image of said circular measuring scale on said image screen even though the measuring scale on said indexing head remains stationary, said last named means including a roof top prism as a part of said optical means, a guide structure for slidably supporting said prism, and manually operable cam means for adjusting said prism in said guide structure.

18. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said scale onto said viewing screen, and means causing at lateral displacement of the image of said circular measuring scale on said image screen even though the measuring scale on said indexing head remains stationary, said last named means including a roof top prism as a part of said optical means, a guide structure for slidably supporting said prism, manually operable cam means for adjusting said prism in said guide structure and spring means for maintaining said prism in continuous engagement with said cam means.

19. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the mount of shifting of said straight micrometric scale, means for adjusting said circular measuring scale about its center of curvature so as to project an image of different portions of said scale on to said viewing screen, and means causing a lateral displacement of the image of said circular measuring scale on said image screen even though the measuring scale on said indexing head remains stationary, said last named means including a roof top prism as a part of said optical means, a guide structure for slidably supporting said prism, manually operable cam means for adjusting said prism in said guide structure, and manually operable means for locking said roof top prism in the desired position.

20. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a spindle on which said indexing head is fixedly attached, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, means for adjusting said circular measuring scale about its center of curvature so as to project an image of different portions of said circular measuring scale onto said viewing screen, means causing a lateral displacement of the image of said circular measuring scale on said image screen even though the measuring scale on said indexing head remains stationary, said means comprising a housing having mounted thereon said viewing screen and said eccentric ring which latter is rotatably adjustable relatively to said housing, said housing also supporting said optical means for forming said image of said circular measuring scale, means for rotatably adjusting said housing with said optical means therein about the axis of said spindle of said optical indexing head, means for rotatably supporting said housing on the spindle of said indexing head, ball bearings for rotatably supporting said housing on the spindle of said indexing head, and means for locking said rotatably mounted housing in the desired position.

21. Reading device for an indexing machine having an optical indexing head, comprising a circular measuring scale arranged on said indexing head, said circular measuring scale being provided with double scale lines and the distance between each two pairs of said double scale lines being 10°, optical means for projecting an image of a portion of said circular measuring scale onto a plane viewing screen, a plane glass plate provided with a straight micrometric scale arranged adjacent said plane viewing screen and subdividing an interval of the image of said measuring scale appearing on said screen, means for shifting said plane glass plate with said micrometric scale in its plane relative and lengthwise of said image of said measuring scale, said means comprising a pin carried by said plane glass plate and a manually rotatably adjustable eccentric ring engaging said pin, said eccentric ring being provided with a circular scale appearing with said straight micrometric scale on said viewing screen, said circular scale indicating the amount of shifting of said straight micrometric scale, and means for adjusting said circular measuring scale about its center of curvature so as to project an image of different portions of said scale onto said viewing screen, said measuring scale being provided with numbers arranged on one rotatable member, and the scale lines of said measuring scale being arranged on another rotatable member, said two rotatable members being relatively rotatably arranged with respect to each other.

References Cited in the file of this patent

UNITED STATES PATENTS

| | | |
|---|---|---|
| 669,705 | Reeh | Mar. 12, 1901 |
| 2,161,536 | Sordoillet | June 6, 1939 |
| 2,437,807 | Dowell et al. | Mar. 16, 1948 |
| 2,566,875 | Dietrich et al. | Sept. 4, 1951 |

FOREIGN PATENTS

| | | |
|---|---|---|
| 574,295 | Great Britain | Dec. 31, 1945 |
| 760,881 | Great Britain | Nov. 7, 1956 |
| 975,598 | France | Oct. 17, 1950 |